United States Patent
Knebel et al.

(10) Patent No.: US 6,807,625 B1
(45) Date of Patent: Oct. 19, 2004

(54) METHOD AND APPARATUS FOR EFFICIENTLY GENERATING, STORING, AND CONSUMING ARITHMETIC FLAGS BETWEEN PRODUCING AND CONSUMING MACROINSTRUCTIONS WHEN EMULATING WITH MICROINSTRUCTIONS

(75) Inventors: Patrick Knebel, Ft Collins, CO (US); Mark Gibson, Timnath, CO (US); Rohit Bhatia, Fort Collins, CO (US); Kevin David Safford, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/507,032

(22) Filed: Feb. 18, 2000

(51) Int. Cl.$^7$ .............................................. G06F 15/00
(52) U.S. Cl. ..................................................... 712/221
(58) Field of Search ........................ 712/221, 41, 209, 712/227

(56) References Cited

U.S. PATENT DOCUMENTS

| | | | |
|---|---|---|---|
| 5,313,614 A | * 5/1994 | Goettelmann et al. ...... | 717/138 |
| 5,481,693 A | * 1/1996 | Blomgren et al. .......... | 712/225 |
| 5,619,664 A | * 4/1997 | Glew ......................... | 712/218 |
| 5,774,694 A | 6/1998 | Murari ....................... | 395/500 |
| 5,859,999 A | 1/1999 | Morris et al. ............... | 395/565 |
| 5,860,017 A | 1/1999 | Sharangpani et al. .. | 395/800.23 |
| 5,884,059 A | * 3/1999 | Favor et al. ................. | 712/215 |
| 6,049,864 A | * 4/2000 | Liu et al. .................... | 712/214 |

FOREIGN PATENT DOCUMENTS

| | | | | |
|---|---|---|---|---|
| JP | 4195629 A | 7/1992 | ........... | G06F/9/308 |

OTHER PUBLICATIONS

Dictionary of Computers, Information Processing, & Telecommunications, Jerry M. Rosenberg. Second Edition. John Wiley & Sons, Inc.: 1987. p. 161.*

IA–32 Intel® Architecture Software Developer's Manual vol. 1: Basic Architecture. Intel Corporation. ©1997. pp. 5–1 to 5–28.*

Dictionary of Computers, Information Processing, & Telecommunications. Jerry M. Rosenberg. Second Edition. John Wiley & Sons, Inc.: 1987. p. 359.*

American Heritage Dictionary. yourDictionary.com. ©2002.* searchVB.com Definitions. macro. Aug. 27, 2001.*

Rosenberg, Jerry M. "Computers, Information Processing, & Telecommunications". Second Edition. New York: John Wiley & Sons, Inc. ©1987. p. 205, Emulation.*

Mano, M. Morris. "Digital Design". Englewood Cliffs, New Jersey: Prentice–Hall, Inc. ©1984. pp. 154–160.*

Heuring, Vincent P. and Jordan, Harry F. "Computer Systems Design and Architecture". Reading, Massachusetts: Addison Wesley Longman, Inc. ©1997. pp. 262–270.*

Wolfe, A., "Patents shed light on Merced's Innards", Electronic Engineering Times, Feb. 15, 1999.

* cited by examiner

Primary Examiner—Eddie Chan
Assistant Examiner—Aimee J. Li

(57) ABSTRACT

An apparatus and method for efficiently generating arithmetic flags in a computer system. The system includes an eflags register to stored partially computed flags computed by an arithmetic logic unit. The stored partial flags are computed in one cycle. The stored flags are decoded by one of two consuming instructions, PRODF or TBIT, in a second cycle.

21 Claims, 4 Drawing Sheets

METHOD AND APPARATUS FOR EFFICIENTLY GENERATING, STORING, AND CONSUMING ARITHMETIC FLAGS BETWEEN PRODUCING AND CONSUMING MACROINSTRUCTIONS WHEN EMULATING WITH MICROINSTRUCTIONS

TECHNICAL FIELD

The invention relates to generating flags. More particularly, the invention relates to methods and apparatus for emulating arithmetic status flags specified in an IA-32 ISA on an IA-64 Machine.

BACKGROUND ART

Many of today's highest performance computers implement a Reduced Instruction Set Computer (RISC) Instruction Set Architecture (ISA). A vast amount of today's software, however, is written for an IA-32ISA, a Complex Instruction Set Computer (CISC) architecture. In order to run the IA-32 software on a RISC machine, it is necessary for the RISC machine to emulate the instructions from the CISC ISA. This emulation is accomplished by converting each CISC macroinstruction into a sequence of one or more RISC microinstructions. To meet the performance requirements of emulation mode, it is necessary to convert often-executed macroinstructions into the shortest number of microinstructions as possible. An example of often-executed macroinstructions are add, subtract, and conditional branch. In the IA-32ISA, these instructions either produce or consume arithmetic flags (EFLAGS). Thus, the problem is how to efficiently emulate these IA-32 instructions on a RISC machine that does not have native support for arithmetic flag generation and consumption.

In the IA-32 architecture, certain instructions (an ADD, SUB, etc, instruction) will produce arithmetic flags that are implicitly written into bits of the IA-32 EFLAGS register. Prior art RISC processors convert each of these producing macroinstructions into a single microinstruction that requires two cycles to execute, the first cycle for producing the arithmetic result, and the second cycle for producing the arithmetic flags. Also in the IA-32 architecture, certain instructions (e.g., Jump if Condition is Met, Jcc) consume or test bits of the EFLAGS register. Prior art RISC processors have converted these consuming macroinstructions into microinstruction sequences that may include a single instruction capable of testing a bit of EFLAGS in a single cycle. Thus, these prior art processors require a total of three cycles to produce and consume EFLAGS.

Unfortunately, by producing and consuming flags in this manner, the prior art has these drawbacks:

1) Taking an extra cycle to generate flags for a basic instruction such as ADD degrades performance if a consuming instruction immediately follows the producing instruction. This is because the consuming instruction will be required to stall for one cycle to wait for the producer to generate the flags.
2) Extra complexity is required to detect the above-mentioned condition and generate the necessary pipeline stall.
3) Extra complexity is required to bypass the flag results if the consumer is following the producer by 1–3 cycles. This bypass hardware is typically a critical part of the implementation that affects overall speed and area.
4) If the IA-64 machine uses multiple ALU's to emulate the IA-32 ISA, then each ALU may be required to have additional hardware to implicitly generate these flags.

SUMMARY OF INVENTION

A method consistent with the present invention generates arithmetic flags. The method includes executing an instruction via an execution unit to produce a result. Performing partial computation of one or more of the flags based on the result, once the result is obtained, and storing the partial computation of the one or more flags. A final flag is obtained upon completing the computation of the one or more flags.

An apparatus consistent with the present invention generates arithmetic flags. The apparatus includes an execution unit to execute an instruction and produce a result. The execution unit preforms partial computation on the result to produce an intermediate format of the result. The intermediate format is stored in an eflags register. A consuming instruction decodes the intermediate format and produces a final result for the flags.

Those skilled in the art will appreciate these and other advantages and benefits of various embodiments of the invention upon reading the following detailed description of a preferred embodiment with reference to the below-listed drawings.

DETAILED DESCRIPTION OF A PREFERRED EMBODIMENT

Figure 1:
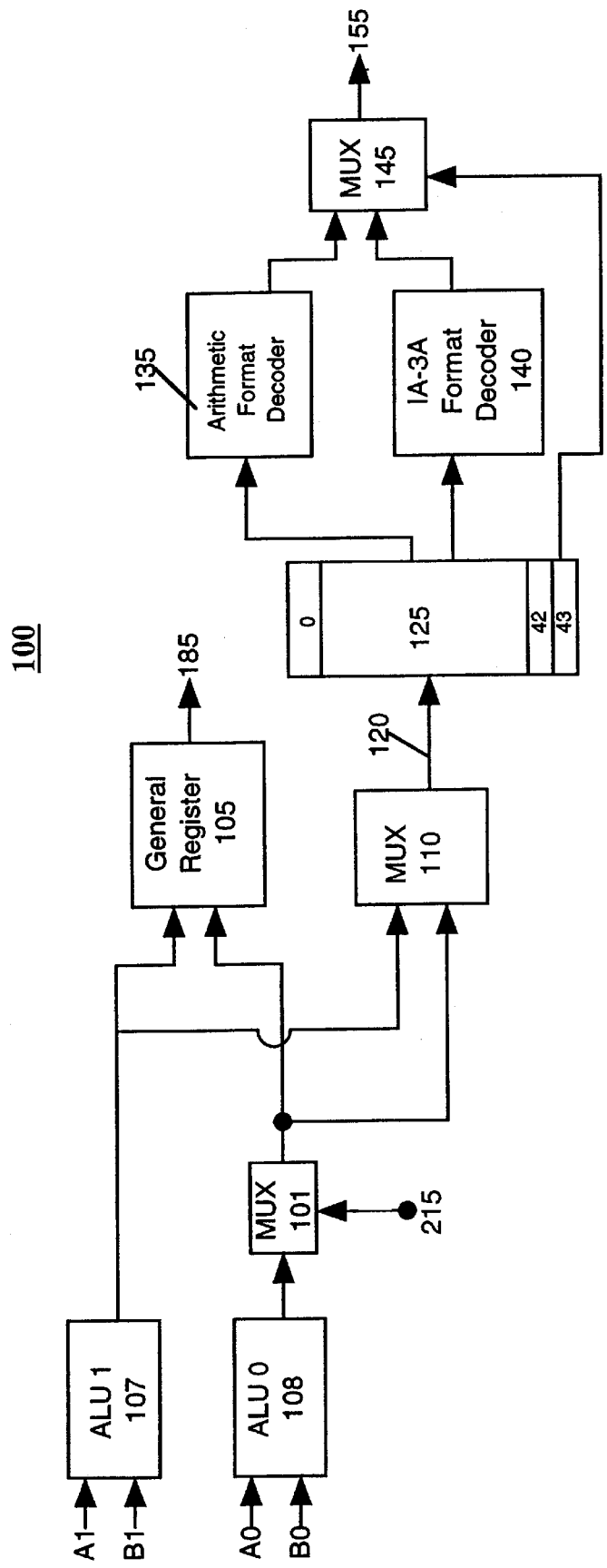
FIG. 1 is a block diagram of an embodiment of the present invention for generating and decoding an IA-32ISA arithmetic flags based on the result of an arithmetic instruction executed on a RISC machine.

In the IA-32ISA, the EFLAGS register is defined to contain six status flags. These flags are defined as: bit 11 (overflow); bit 7 (sign); bit 6 (zero); bit 4 (adjust); bit 2 (parity); and bit 0 (carry). These flags can be written explicitly by executing certain instructions such as a POPF (pop stack into EFLAGS) instruction, or they can be written implicitly by executing some other instruction that is defined to write these bits as a side-effect (e.g. ADD, SUB, etc). These flags can be read explicitly by executing certain instructions such as a PUSHF (push EFLAGS onto stack) instruction, or they can be read implicitly by certain instructions (e.g. Jump on Condition Code, Jcc). The Jcc instruction may also test a combination of the defined flags in order to test the following conditions: less than (lt), less than or equal (le), below or equal (be). In order to quickly test for each condition, it is desirable to store three extra flags representing these three conditions. In addition, the inverse of all the flags and conditions may be tested.

Most RISC ISA's do not define status flags such as those in the IA-32ISA. This is because the status flags are difficult to implement without either affecting the cycle time of the machine or requiring multiple cycles to execute the instructions which implicitly write to these bits. The present invention generates IA-32 status flags in a single cycle without affecting cycle time by storing the flags in an intermediate format.

FIG. 1 illustrates a system 100 on how the intermediate format is generated, stored, and decoded. The intermediate format of the status flags is held in an implementation-dependent EFLAGS register 125, that is set from an EFLAGS bus 120. The EFLAGS bus 120 can be driven from four sources that are selected from two multiplexors 101 and 110. MUX 110 selects between ALU1 107 or from MUX 101, and MUX 101 selects between ALU0 108 and merged flag result 215. As an example, the machine may execute a flag-producing instruction, ADD A0,B0, on ALU0 108. Initially input A0 is added to input B0 by ALU0 108. The ALU0 108 calculates and outputs a result, and the result is written into a general register file 105 through MUX 101. In the time remaining in the cycle used for this operation, the ALU0 108 will calculate as much of the nine flags as possible. Rather than produce the actual flags, the RISC machine will produce an intermediate result for the nine flags in that cycle and latch the result in the implementation-dependent EFLAGS register 125 through MUX 110.

In addition, ALU1 107 may also be used to generate results and intermediate EFLAGS results via MUX 110. When the intermediate format is generated implicitly as a side-affect of an arithmetic result, the intermediate format is stored in a first format known as arithmetic format and indicated by bit 43 of the EFLAGS register 125 being set to 1.

The intermediate format can be arbitrarily defined to include as much computation towards the final EFLAGS results by the producing instruction as the cycle time or other resources (wires, area, etc.) allow. The intermediate format is conceptual; each implementation may define it differently to work best for that implementation. Thus, rather than produce a result for all of the flags, which may require multiple cycles, the machine can determine how much of the result can be completed in any time remaining in the first cycle and store that result as the intermediate format, and have an instruction consuming the flags decode the intermediate format. For example, if the ALU0 108 took nine tenths of the first cycle, the system has one tenth of the cycle left. The machine will produce results of as much of the flags as possible in the extra one tenth of a cycle, and then stop and latch the result and place it in the EFLAGS register 125.

In addition to the instructions that implicitly write the EFLAGS register 125, it is necessary to have one or more instructions that explicitly manipulate the EFLAGS register 125. The present invention defines an implementation-dependent RISC instruction, PRODF. This instruction can be used to read, write, set, or clear any or all of the nine flags stored in the intermediate format. The parameters of the PRODF instruction include a source register, a mode, a mask, and a destination register.

Figure 2:
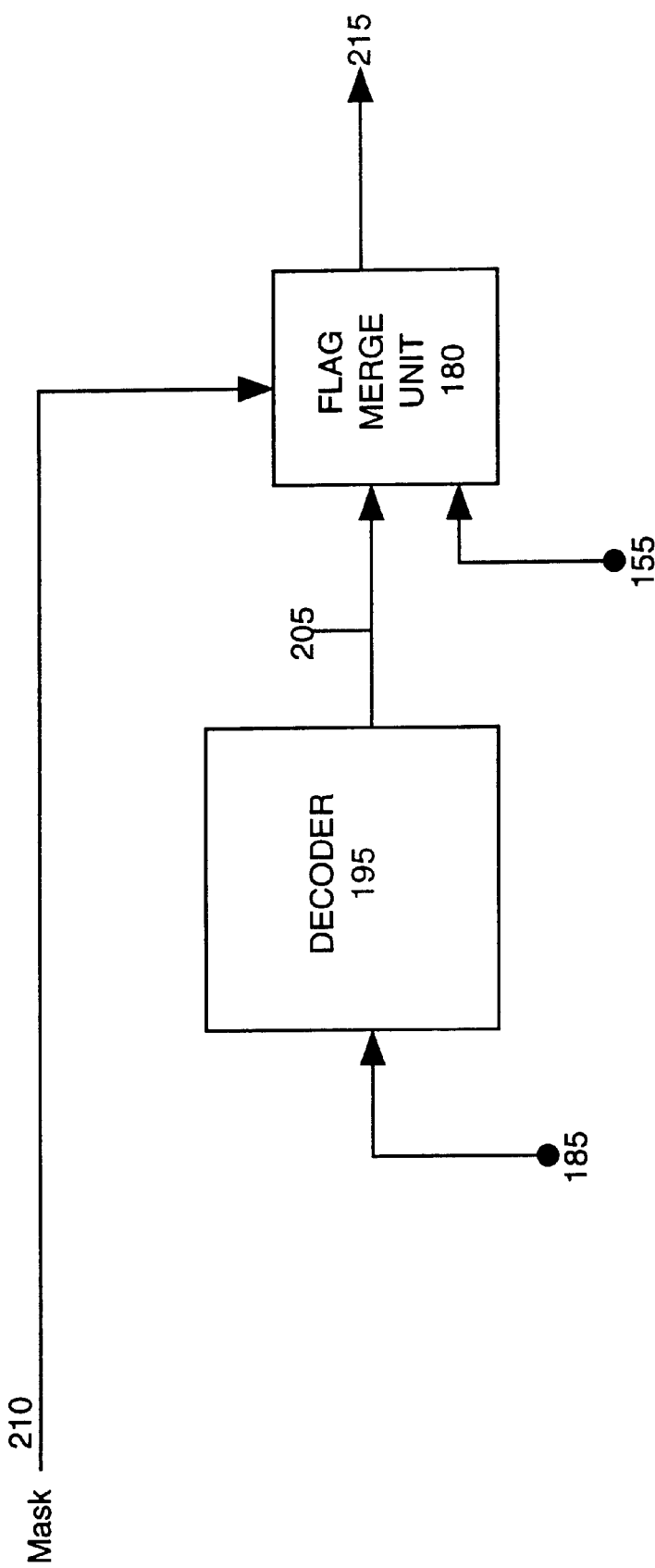
FIG. 2 is a block diagram of a flag merge unit.

FIG. 2 illustrates a diagram of a flag merge unit 180 that shows how the PRODF instruction may be used to manipulate the EFLAGS register 125. When the machine is emulating an IA-32 instruction that writes the EFLAGS register 125 (e.g. POPF), it executes a PRODF instruction with parameters that indicate the machine reads the specified source register from the general register file 105, uses a decoder 195 to select the flag bits from the IA-32 defined positions, selects all the flags from bus 205 via the flag merge unit 180, drives result 215 into the EFLAGS register 125 via MUX 101 and MUX 110, and ignores the destination register.

When the intermediate format is generated explicitly by a PRODF instruction, the intermediate format is stored in a second format known as IA-32 format and indicated by bit 43 of the EFLAGS register 125 being set to 0. When the machine is emulating an IA-32 instruction that explicitly reads the EFLAGS register 125 (e.g. PUSHF), it executes a PRODF instruction with parameters that indicate the machine decode the intermediate format via an arithmetic decoder 135 and an IA-32 format decoder 140, selects one of the two decoded results via MUX 145, selects all of the flags via the flag merge unit 180, drives the result 215 into an indicated destination register in the general register file 105 via MUX 101.

Likewise, to set or clear individual bits of the EFLAGS register 125, the machine executes a PRODF instruction with parameters that indicate the machine decode the intermediate format in blocks via the arithmetic decoder 135 and the IA-32 format decoder 140, select one of the two decoded results via the MUX 145, and output decoded flag 155. The flag merge unit 180 selects either the decoded flags 155 or zeroes or ones as specified by mask 210, and writes the EFLAGS register 125 via MUX 101 and MUX 110.

Figure 3:
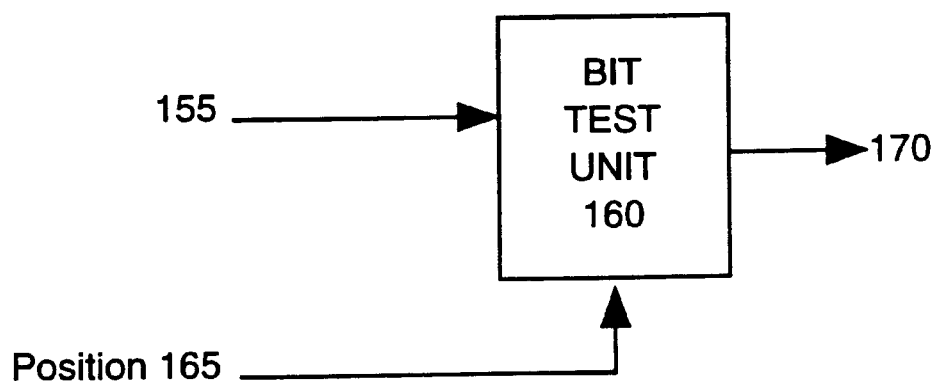
FIG. 3 is a block diagram of a bit test unit.

The present invention also defines an implementation dependent RISC instruction, TBIT. FIG. 3 illustrates a diagram of a bit test unit 160 that shows how the TBIT instruction is used to implicitly read the intermediate format and generate a result based on the flag. When the machine is emulating an IA-32 instruction that tests a bit of the EFLAGS (e.g. Jcc), it executes a TBIT instruction with parameters that indicate the machine decode the intermediate format via the arithmetic decoder 135 and the IA-32 format decoder 140, selects one of the two decoded results via MUX 145, selects one of these flags as specified by position 165 via the bit test unit 160, and drive the result 170.

When stored in arithmetic format, the intermediate result has the following format: bits 0–31 contain the ALU result; bits 32–38 describe carry out results; bits 39–40 indicate the size of the operation that generated the result (8, 16, or 32 bit); bits 41–42 indicate the type of operation that generated the result, (add, sub, logical), and bit 43 is a 1. When stored in IA-32 format, the intermediate format has the following format: bit 11 is overflow flag; bit 7 is sign flag; bit 6 is zero flag; bit 4 is adjust flag; bit 2 is parity flag; bit 0 is carry flag; and bit 43 is a 0.

In prior art, the boundary between instructions producing flags and those consuming flags was drawn after the flags were fully generated. By changing the boundary between producer to the consumer, this allows both the producer and consumer to calculate results in a single cycle. This requires that the flags be held in an intermediate format. The intermediate format is defined such that it is easy to generate from an ALU that is designed for a RISC microprocessor, without affecting the cycle time of the processor.

Figure 4:
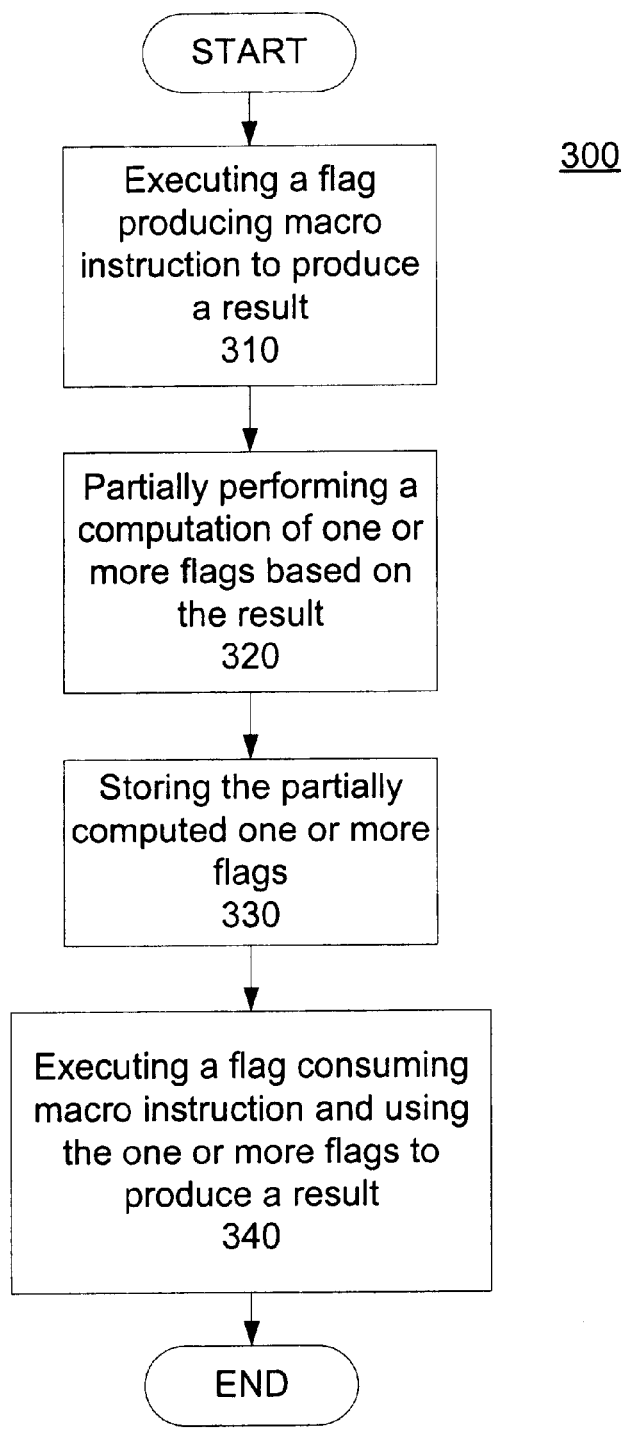
FIG. 4 is a flowchart illustrating an embodiment of a method for generating arithmetic flags.

FIG. 4 is a flowchart illustrating an embodiment of a method 300 for generating arithmetic flags. As shown, the method 300 includes the steps of executing a flag producing macro instruction to produce a result 310, partially performing a computation of one or more flags based on the result 320, storing the partially computed one or more flags 330, and executing a flag consuming macro instruction and using the one or more flags to produce a result 340.

What is claimed is:

1. A method for emulating the production and consumption of arithmetic flags in a single cycle comprising:

partially emulating a flag producing macroinstruction that performs an arithmetic operation, wherein the partially emulating step comprises executing a sequence of one or more microinstructions that:

generate an arithmetic result as specified by the macroinstruction;

generate one or more partial arithmetic flags from the results of the generating an arithmetic result step; and store in an intermediate format the one or more partial arithmetic flags and one or more bits of extra information based on the type and size of the arithmetic operation, the intermediate format being arbitrarily defined to include as much computation towards final results as resources allow;

passing the one or more partial arithmetic flags and one or more bits of extra information across the macroinstruction boundary signifying the completion of the flag producing macroinstruction; and emulating a flag consuming macroinstruction, wherein the emulating step comprises executing a sequence of one or more microinstructions that:
generate one or more final flags from the one or more partial arithmetic flags and the one or more bits of extra information; and
complete the emulation of the flag consuming macroinstruction using the one or more final flags.

2. The method of claim 1, further comprising the step of emulating an arbitrary sequence of one or more macroinstructions in between the passing and emulating steps.

3. The method of claim 1, further comprising the step of emulating an arbitrary sequence of microinstructions in between the passing and emulating steps.

4. The method of claim 1, wherein the step of partially emulating a flag producing macroinstruction and the step of emulating a flag consuming macroinstruction are performed with no intervening macroinstructions.

5. The method of claim 1, wherein the flag consuming macroinstruction is selected from the group consisting of a PRODF instruction and a TBIT instruction.

6. The method of claim 5, wherein the PRODF instruction step comprises moving the one or more final flags to an eflags register.

7. The method of claim 5, wherein the PRODF instruction step comprises moving the one or more final flags from an eflags register.

8. The method of claim 1, wherein the step of emulating a flag consuming macroinstruction further comprises decoding the one or more partial arithmetic flags.

9. The method of claim 1, wherein the passing step comprises storing the one or more partial arithmetic flags in storage that persists across macroinstruction boundaries.

10. A method for emulating the production of arithmetic flags and storage to memory in an architected format in a single cycle, comprising:
partially emulating a flag producing macroinstruction that performs an arithmetic operation, wherein the partially emulating step comprises executing a sequence of one or more microinstructions that:
generates an arithmetic result as specified by the macroinstruction;
generates one or more partial arithmetic flags from the results of the generating an arithmetic result step; and
stores in an intermediate format the one or more partial arithmetic flags and one or more bits of extra information based on the type and size of the arithmetic operation, the intermediate format being arbitrarily defined to include as much computation towards final results as resources allow;
passing the one or more partial arithmetic flags and one or more bits of extra information across the macroinstruction boundary signifying the completion of the flag producing macroinstruction; and executing a sequence of microinstructions, wherein the execution:
generates one or more final flags from the one or more partial arithmetic flags and the one or more bits of extra information; and
stores the one or more final flags to a location in main memory in an architected format.

11. The method of claim 10, further comprising the step of emulating an arbitrary sequence of one or more macroinstructions in between the passing and executing steps.

12. The method of claim 10, further comprising the step of emulating an arbitrary sequence of microinstructions in between the passing and executing steps.

13. The method of claim 10, wherein the step of partially emulating a flag producing macroinstruction and the step of executing a sequence of microinstruction are performed with no intervening macroinstructions.

14. The method of claim 10, wherein the architected format is an IA-32 format.

15. A method for emulating the production and consumption of flags in a single cycle comprising:
partially emulating a flag producing macroinstruction that performs an operation, wherein the partially emulating step comprises executing a sequence of one or more microinstructions that:
generates a result of the operation as specified by the macroinstruction;
generates one or more partial flags from the results of the generating a result step; and
stores in an intermediate format the one or more partial flags and one or more bits of extra information based on the type and size of the operation, the intermediate format being arbitrarily defined to include as much computation towards final results as resources allow;
passing the one or more partial flags and one or more bits of extra information across the macroinstruction boundary signifying the completion of the flag producing macroinstruction; and
emulating a flag consuming macroinstruction, wherein the emulating step comprises executing a sequence of one or microinstructions that:
generates one or more final flags from the one or more partial flags and the one or more bits of extra information, wherein:
if the flag producing macroinstruction is an explicit flag-writing operation, then the generating one or more final flags step comprises using a first block of hardware to decode the one or more partial flags, and
if the flag producing macroinstruction is an implicit flag-writing operation, then the generating one or more final flags step comprises using a second block of hardware to decode the one or more partial flags; and
completes the emulation of the flag consuming macroinstruction using the one or more final flags.

16. The method of claim 15, wherein, if the flag producing macroinstruction is an explicit flag-writing operation, then the one or more partial flags are in an arithmetic format.

17. The method of claim 16, wherein the architected format is an IA-32 format.

18. The method of claim 15, wherein, if the flag producing macroinstruction is an explicit flag-writing operation, then the one or more partial flags are in an architected format.

19. The method of claim 15, further comprising the step of emulating an arbitrary sequence of one or more macroinstructions in between the passing and executing steps.

20. The method of claim 15, further comprising the step of emulating an arbitrary sequence of microinstructions in between the passing and executing steps.

21. The method of claim 15, wherein the step of partially emulating a flag producing macroinstruction and the step of emulating a flag consuming macroinstruction are performed with no intervening macroinstructions.

* * * * *